US 6,658,649 B1

(12) United States Patent
Bates et al.

(10) Patent No.: US 6,658,649 B1
(45) Date of Patent: Dec. 2, 2003

(54) METHOD, APPARATUS AND ARTICLE OF MANUFACTURE FOR DEBUGGING A USER DEFINED REGION OF CODE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 09/592,391

(22) Filed: Jun. 13, 2000

(51) Int. Cl.$^7$ .............................. G06F 9/44; H02H 3/05
(52) U.S. Cl. ...................... 717/124; 717/129; 714/38
(58) Field of Search .................... 717/124–135; 714/25, 34, 35, 37–38, 45; 712/227

(56) References Cited

U.S. PATENT DOCUMENTS

| | | | | |
|---|---|---|---|---|
| 5,446,900 A | | 8/1995 | Kimelman | 395/700 |
| 6,077,311 A | * | 6/2000 | Lichtenstein et al. | 717/128 |
| 6,079,032 A | * | 6/2000 | Peri | 714/38 |
| 6,126,328 A | * | 10/2000 | Mallory et al. | 717/114 |
| 6,158,045 A | * | 12/2000 | You | 717/124 |
| 6,405,364 B1 | * | 6/2002 | Bowman-Amuah | 717/101 |
| 6,412,106 B1 | * | 6/2002 | Leask et al. | 717/124 |

OTHER PUBLICATIONS

Biddle et al. Reuse of Debuggers for Visualization of Reuse. ACM. 1999. pp. 92–100.*
Khoshgoftaar et al. Detection of Software Modules with High Debug Code Churn in a Very Large Legacy System. IEEE. 1996. pp. 364–371.*
McDowell et al. Debugging Concurrent Programs. ACM. 1989. pp. 593–622.*
Mukherjea et al. Toward Visual Debugging: Integrating Algorithm Animation Capabilities Within a Source Level Debugger. ACM. 1994. pp. 215–244.*
U.S. patent application Ser. No. 09/255,109 filed Feb. 22, 1999.
Rosenberg, "How Debuggers Work: Algorithms, Data Structures, and Architecture", Wiley Computer Publishing© 1996, pp. 119–133, 197–204.

* cited by examiner

Primary Examiner—Wei Zhen
(74) Attorney, Agent, or Firm—Moser, Patterson & Sheridan, L.L.P.

(57) ABSTRACT

The preferred embodiment of the present invention generally provides a method, apparatus and article of manufacture for debugging computer programs. Debugging computer programs is aided by establishing a step region. The step region is delimited by an entry point and an exit point and may include any number of step elements (e.g., instructions, statement, line numbers, etc.). When a step region is entered in response to a command, the code contained in the region is executed until the end of the region. Execution is halted for inspection of the region by a user. The executed step region can be formatted (e.g., by highlighting, bolding, italicizing, shading and the like) to identify executed instructions.

18 Claims, 9 Drawing Sheets

| MODULE | REGION NUMBER | ENTRY POINT | EXIT POINT | STEP ELEMENTS | REGION INFORMATION |
|---|---|---|---|---|---|
| A | 1 | 003 | 015 | INSTRUCTIONS FOR REGION 1 | 003-009 |
| | 2 | 051 | 066 | INSTRUCTIONS FOR REGION 2 | 051-061 |
| | 3 | 079 | 085 | INSTRUCTIONS FOR REGION 3 | 079-080, 083-085 |
| | 4 | 092 | 0101 | INSTRUCTIONS FOR REGION 4 | 092-0101 |
| B | 1 | 002 | 007 | INSTRUCTIONS FOR REGION 5 | 002-007 |
| | 2 | 019 | 031 | | 019-025 |
| | 3 | 042 | 071 | | 042-047; 068-071 |

*Fig. 3*

```
001    INT HASH_REMOVE (HASH_TABLE_T*TABLE,VOID*KEY,VOID*(REC))
002    {
003        INT INDEX;
004        HASH_WORK_REC_T *PTR;
005        HASH_WORK_REC_T *PAST;
006
007        INDEX= ( TABLE->HASH_KEY ) (KEY);
008        IF ( INDEX < 0 ) INDEX = INDEX * -1;
009        INDEX=INDEX % HASH_TABLE_SIZE;
010
011        PTR = ( (TABLE-> TABLE ) [ INDEX ] ) , PTR
012
013 >>    PAST = NULL;
014       WHILE (PTR ! =NULL )
015       {
016           IF ( TABLE->COMP) ( KEY,PTR ->REC) )
017           {
018               ( *REC ) =PTR ->REC ;
019               IF ( PAST ! =NULL )
020               {
021               PAST-> NEXT =PTR->NEXT;
022               }
023               ELSE
024               {
025               ( (TABLE -> TABLE ) [ INDEX ] ) .PTR = PTR -> NEXT ;
026               }
027               FREE_WORK_REC (PTR);
028               V ( ( ( TABLE-> TABLE ) [ INDEX ] ) . SEMAPHORE ) ;
029               RETURN ( HASH_SUCCESS) ;
030           }
031           PAST=PTR ;
032           PTR=PTR->NEXT ;
033       }
034       ( *REC ) =NULL;
035       RETURN ( HASH_NOTFND ) ;
036    }

==>    SET STEP REGION  14,33
```

Fig. 4

```
001    INT HASH_REMOVE (HASH_TABLE_T*TABLE,VOID*KEY,VOID*(REC))
002    {
003        INT INDEX;
004        HASH_WORK_REC_T *PTR;
005        HASH_WORK_REC_T *PAST;
006
007        INDEX= ( TABLE->HASH_KEY ) (KEY);
008        IF ( INDEX < 0 ) INDEX = INDEX * -1;
009        INDEX=INDEX % HASH_TABLE_SIZE;
010
011        PTR = ( (TABLE-> TABLE ) [ INDEX ] ) , PTR
012
013 >>     PAST = NULL;
014        WHILE (PTR ! =NULL )
015        {
016            IF ( TABLE->COMP) ( KEY,PTR ->REC) )
017            {
018                ( *REC ) =PTR ->REC ;
019                IF ( PAST ! =NULL )
020                {
021                    PAST-> NEXT =PTR->NEXT;
022                }
023                ELSE
024                {
025                    ( (TABLE -> TABLE ) [ INDEX ] ) .PTR = PTR -> NEXT ;
026                }
027                FREE_WORK_REC (PTR);
028                V ( ( ( TABLE-> TABLE ) [ INDEX ] ) . SEMAPHORE ) ;
029                RETURN ( HASH_SUCCESS) ;
030            }
031            PAST=PTR ;
032            PTR=PTR->NEXT ;
033        }
034        ( *REC ) =NULL;
035        RETURN ( HASH_NOTFND ) ;
036    }

==>   STEP
```

Fig. 5

```
001     INT HASH_REMOVE (HASH_TABLE_T*TABLE,VOID*KEY,VOID*(REC))
002     {
003         INT INDEX;
004         HASH_WORK_REC_T *PTR;
005         HASH_WORK_REC_T *PAST;
006
007         INDEX= ( TABLE->HASH_KEY ) (KEY);
008         IF ( INDEX < 0 ) INDEX = INDEX * -1;
009         INDEX=INDEX % HASH_TABLE_SIZE;
010
011         PTR = ( (TABLE-> TABLE ) [ INDEX ] ) , PTR
012
013         PAST = NULL;
014  *     WHILE (PTR ! =NULL )
015  *     {
016  *         IF ( TABLE->COMP) ( KEY,PTR ->REC) )
017            {
018                ( *REC ) =PTR ->REC ;
019                IF ( PAST ! =NULL )
020                {
021                PAST-> NEXT =PTR->NEXT;
022                }
023                ELSE
024                {
025                ( (TABLE -> TABLE ) [ INDEX ] ) .PTR = PTR -> NEXT ;
026                }
027                FREE_WORK_REC (PTR);
028                V ( ( ( TABLE-> TABLE ) [ INDEX ] ) . SEMAPHORE ) ;
029                RETURN ( HASH_SUCCESS) ;
030            }
031  *         PAST=PTR ;
032  *         PTR=PTR->NEXT ;
033  *     }
034  >>    ( *REC ) =NULL;
035        RETURN ( HASH_NOTFND ) ;
036     }

METHOD, APPARATUS AND ARTICLE OF MANUFACTURE FOR DEBUGGING A USER DEFINED REGION OF CODE

BACKGROUND OF THE INVENTION

1. Field of the Invention

The present invention relates to computers and computer software. More specifically, the invention is generally related to debugging software.

2. Background of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"). The debugger is commonly located on and executed by the same computer system on which the program is executed.

Conventional debuggers typically support various operations to assist a computer programmer. Each operation allows the programmer to examine the state of program registers and variables at a given point in the execution of a program. A first operation supported by conventional debuggers is a breakpoint operation. A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

A second operation supported by conventional debuggers is a "step" function. Step functions known in the art include "step through" (also known as "step into") and "step over" (also known as "skip" and "next") operations. Step functions permit a computer programmer to process instructions in a computer program at a source file level (i.e., line by line) and at a statement level, and see the results upon completion of each instruction.

Another operation commonly used by programmers debugging code is known as a "run to" operation. "Run to" operations allow a user to execute code until reaching a predetermined point. For example, a first "Run to" operation makes it possible to skip directly to the end of a procedure from a current position in the procedure. A second "run to" operation allows a programmer to determine where execution will be halted according to placement of a cursor.

Typically, step operations, breakpoints and "run to" operations are used together to simplify the debugging process. Specifically, a common debugging operation is to set a breakpoint at the beginning of a desired set of instructions to be analyzed, and then execute the program. Once the breakpoint is reached, the program is halted, and the programmer then steps through the desired set of instructions line by line or statement by statement using the step operation. Alternatively, the programmer may advance to subsequent points in code space using "run to" operations. Consequently, a programmer is able to isolate and analyze a particular set of instructions without having to step through irrelevant portions of a computer program.

Despite the advantages provided by conventional debugging operations, today's programmers often find the need for additional flexibility. For example, it is often desirable to apply step operations to discrete blocks of code. Conventional solutions include using "run to" points and breakpoints in conjunction with step operations in the manner described above. However, these methods becomes exceedingly time-consuming when many separate blocks of code must be stepped through repeatedly. This also approach suffers because breakpoints are active even when the programmer is not interested in stepping, thereby impacting the efficiency of the programmer.

Another solution is to designate a number (N) of statements to step through. This method, offered by many conventional debuggers, is also burdensome to the programmer because the value of N must be calculated for each separate block of code, and N may be different for each time through the block depending on the control flow.

The disadvantages associated with the prior art are even more pronounced when the code being debugged is preprocessed by a code generator. A code generator operates to add code segments to the code being debugged which may be of no interest to a programmer, thereby further reducing the efficiency of the debugging process. Therefore, there is a need for a debugging program adapted to address the problems associated with step operations.

SUMMARY OF THE INVENTION

The present invention generally provides an apparatus, program product, and a method for debugging computer programs that facilitates step operations.

One aspect of the invention provides a method for debugging a target program containing code. The method comprises establishing a region of the code by designating an entry point in the code and an exit point in the code, executing the code, and halting execution of the code at a first executable instruction after the exit point.

Another aspect of the invention provides a signal bearing medium containing code for a program which, when executed by one or more processors, performs the method described above.

Another aspect of the invention provides a computer system comprising a processor, a memory, an input device, a display device and code for a program which, when executed by the processor, performs a method for debugging the code. The method comprises establishing a region of the code by designating an entry point in the code and an exit point in the code, executing the code, and halting execution of the code at a first executable instruction after the exit point.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a data structure of a control point table.

FIG. 4 is an illustration of establishing a step region in source code.

FIG. 5 is an illustration of a step region in source code.

FIG. 6 is an illustration a step region in source code after a step operation.

DETAILED DESCRIPTION OF THE PREFERRED EMBODIMENT

The preferred embodiment of the present invention generally provides a method, apparatus and article of manufacture for debugging computer programs. Debugging computer programs is aided by establishing a step region. The step region is delimited by an entry point and an exit point and may include any number of step elements (e.g., instructions, statement, line numbers, etc.). The executed step region can be formatted (e.g., by highlighting, bolding, italicizing, shading and the like) to identify executed instructions. Embodiments of the invention are described below.

Figure 1:
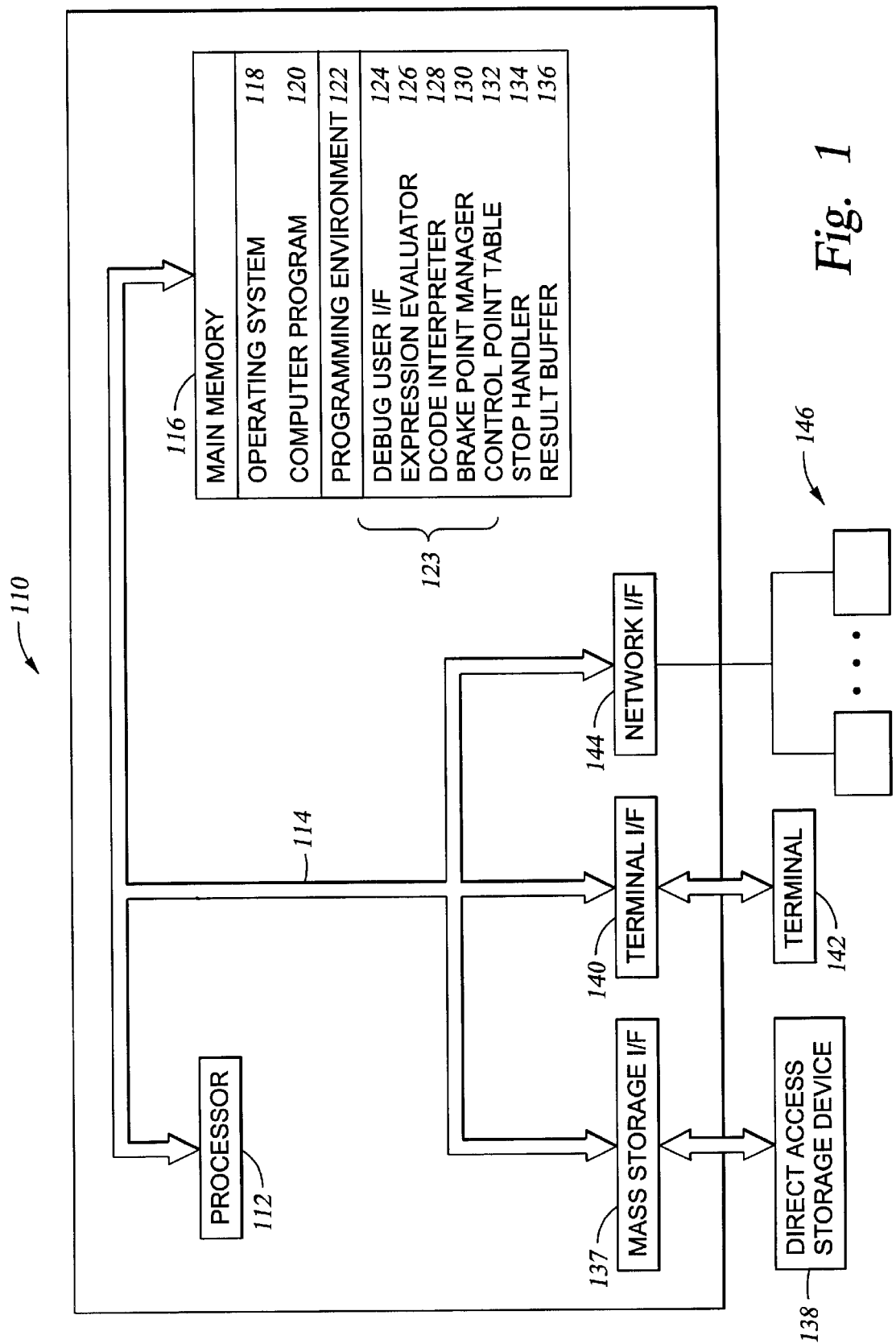
FIG. 1 is a high-level diagram of a computer system consistent with the invention.

Referring now to FIG. 1, a computer system 110 consistent with the invention is shown. For purposes of the invention, computer system 110 may represent any type of computer, computer system or other programmable electronic device, including a client computer, a server computer, a portable computer, an embedded controller, etc. The computer system 110 may be a standalone device or networked into a larger system. In one embodiment, the computer system 110 is an AS/400 available from International Business Machines of Armonk, N.Y.

Computer system 110 is shown for a multi-user programming environment that includes at least one processor 112, which obtains instructions, or operation codes, (also known as op codes), and data via a bus 114 from a main memory 116. The processor 112 could be a PC-based server, a minicomputer, a midrange computer, a mainframe computer, etc. adapted to support the debugging methods, apparatus and article of manufacture of the invention. In particular, the computer processor 112 is selected to support setting and processing breakpoints and step operations. Illustratively, the processor is a PowerPC available from International Business Machines of Armonk, N.Y.

The main memory 116 includes an operating system 118, a computer program 120, and a programming environment 122. The main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

The programming environment 122 facilitates debugging the computer program 120, or computer code, by providing tools for locating, analyzing and correcting faults. One such tool is a debugger program 123 that comprises a debugger user interface 124, expression evaluator 126, Dcode interpreter 128, control point manager (referred to herein as "breakpoint manager 130"), control point table 132, debugger stop handler 134, and result buffer 136. In one embodiment, the debugger 123 is a VisualAge® for Java™ debugger modified according to the invention. VisualAge® for Java™ is available from International Business Machines of Armonk, N.Y.

The computer system 110 could include a number of operators and peripheral systems as shown, for example, by a mass storage interface 137 operably connected to a direct access storage device 138, by a terminal interface 140 operably connected to a terminal 142, and by a network interface 144 operably connected to a plurality of networked devices 146. The terminal 142 and networked devices 146 could be desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
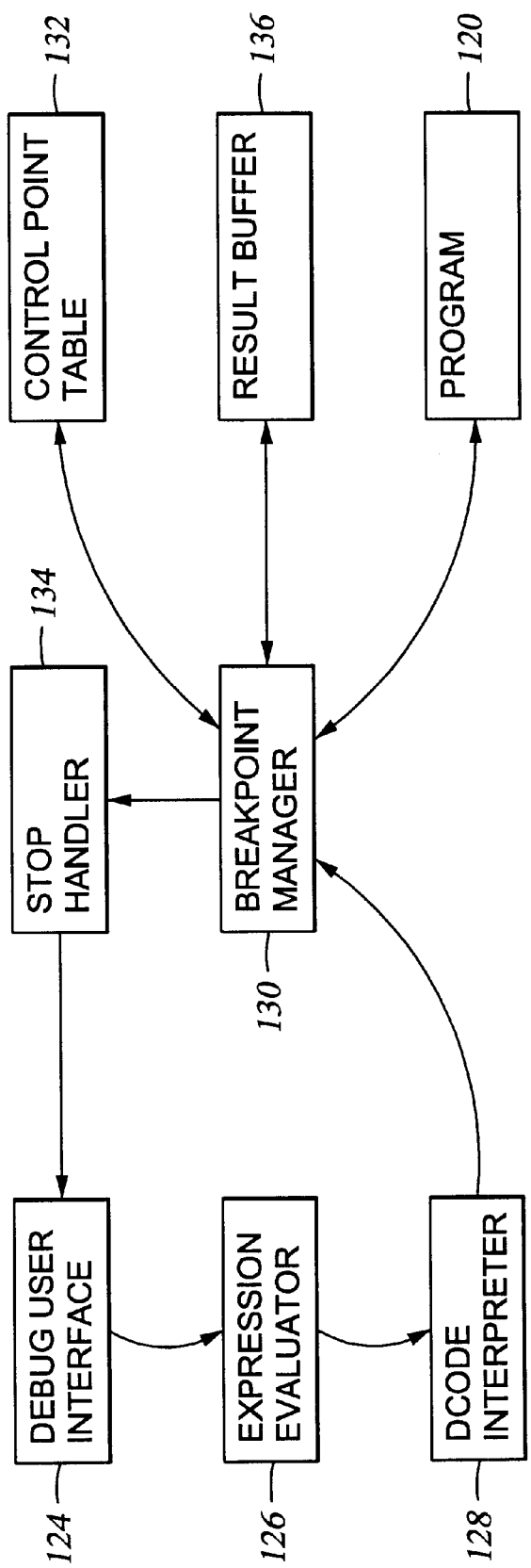
FIG. 2 is a block diagram of an exemplary debugger software environment.

The operational relationship of the debugger program 123 may be understood with reference to FIG. 2 which provides an exemplary software environment for the computer system 110 of FIG. 1. The debugging capability is illustrated in block diagram form, with the elements shown that contribute to maintaining control points (e.g., creating and deleting) and to responding to a system exception. Although shown as separate components, it is understood that one or more of the components may be combined.

A debugging process is initiated by the debug user interface 124. The user interface 124 presents the program under debugging and highlights the current line of the program on which a stop or error occurs. The user interface 124 allows the user to set control points, and display and change variable values by inputting the appropriate commands. The control points of the present invention include step region delimiters (e.g., an entry point and exit point for a code region), breakpoints and the like. In some instances, the user may define the control points by referring to high-order language (HOL) references such as line or statement numbers or software object references such as a program or module name, from which the physical memory address may be cross-referenced.

The expression evaluator 126 parses the debugger command passed from the user interface 124 and uses a table generated by a compiler to map the line number in the debugger command to the physical memory address in memory 116. In addition, the expression evaluator 126 generates a Dcode program for the command. The Dcode program is machine executable language that emulates the commands. Some embodiments of the invention include Dcodes, which when executed, set step regions as will be described in more detail below.

The Dcode generated by the expression evaluator 126 is executed by the Dcode interpreter 128. The interpreter 128 handles expressions and Dcode instructions to set control points and perform other debugging steps. Results from Dcode interpreter 128 are returned to the user interface 124 through the expression evaluator 126. In addition, the Dcode interpreter 128 passes on control point information to the breakpoint manager 130, which takes steps to set (and later handle) the control points and update the control point table 132. In addition to supporting the inventive features described herein, the breakpoint manager 130 also sets and handles conventional debugging control points such as breakpoints.

After the control points are set, the user provides an input that resumes execution of the program 120. Execution of the program eventually results in an encounter of a control point (e.g., an entry point to a step region). The breakpoint manager 130 is then called and references the control point table 132 in order to determine the type of control point encountered and the associated processing. The breakpoint manager 130 then calls the stop handler 134 and program execution is halted. The stop handler 134 is a code segment that returns control to the appropriate user interface, thereby allowing the debugger to have multiple interfaces. The stop handler 134 prompts the debug user interface 124 and may pass the results to the user interface 124. Alternatively, the results may be passed to the result buffer 136 to cache data for the user interface 124.

In one embodiment, the control point information is contained in a data structure such as control point table 132. An illustrative control point table 132 is shown in FIG. 3. The information contained in the table 132 is sufficient to uniquely identify one or more step regions in code space. Illustratively, the table 132 includes a module field 302, a step region number field 304, an entry point location field 306, an exit point location field 308, a step elements field 309 and a region information field 310.

The module field 302 provides an entry to register a particular module of the program 120. The module may contain one or more step regions. An entry in the step region number field 304 is provided for each step region established in a given module. The region number provides a convenient identifier for a particular step region which has been set by the breakpoint manager 130.

The entry point location field 306 contains the line number in source code corresponding to an entry point of the step region. An exit point location field 308 contains the line number in source code corresponding to an exit point of the step region. The information contained in the location fields 306, 308 is used to determine whether an instruction being executed is in a specified region delimited by the entry/exit points.

The step elements field 309 contains a listing of all executable code contained within the boundaries of the respective step region. The elements are defined herein according to code increments stepped by a step operation. For illustration the elements are instructions. Instructions are typically understood to be the smallest executable units in source code. Two or more instructions comprise a statement and multiple statements can be included on a single line. It is well-known to perform step operations at the instruction-level, statement level and line level. Accordingly, although one embodiment is described with respect to instruction level stepping, the present invention contemplates using any known or unknown level of stepping to advantage.

The region information field 310 contains a listing of the executed code within the specified step region. The listing can be in form of line numbers, statements numbers, instruction numbers and the like, depending on a particular embodiment. Illustratively, the field 310 is shown containing line numbers corresponding to the location of executed code in the step region.

It should be appreciated that the table 132 is merely for illustration. Other embodiments would provide fewer or more control point data fields. For example, the table 132 may also contain information for conventional control points such as breakpoints. In addition, this information could be contained in two or more data structures rather than in a single data structure.

An illustration of utilizing the table 132 to set and monitor a step region is provided with reference to FIGS. 4–6. FIG. 4 shows a listing of conventional code arranged in numbered lines in descending order. A prompt (">>") indicates the current position in the execution of the code. Illustratively, a user desires to establish a step region between lines 14 and 33. In one embodiment, the step region is established by parsing user supplied parameters which include an entry point (line 14) and exit point (line 33). Illustrative user supplied parameters are shown on a command line identified by a "===>" prompt. After being parsed, the user supply parameters and other associated data are stored to the control point table 132. Specifically, the module number field 302, the region number field 304, the entry point field 306, the exit point field 308 and the step elements field 309 are populated.

In some embodiments, the established step region may be formatted to facilitate its identification by a user. For example, FIG. 5 shows the step region (established in FIG. 4) formatted in bolded and italicized text. Other embodiments may identify the step region by highlighting, shading, coloring and the like.

FIG. 5 also shows a user supplied command (i.e., "STEP") to execute the code from the current execution location (i.e., line 13). In response to the user supplied command, the code contained in the step region is executed. The executed code is then stored to field 310 of the table 132 as region information.

The status of execution after handling the control points (i.e., the entry point and the exit point) of the step region is illustrated in FIG. 6. Execution is halted at the first statement following the exit point of the step region. In this case, execution is halted on line 034 as shown by the location of the prompt (">>").

In one embodiment, the executed code contained in the step region is formatted. Illustratively, FIG. 6 shows asterisks next to each line containing executed instructions. In other embodiments, the formatting may include highlighting, shading, coloring and the like. In addition, the formatting may be applied to each executed statement or instruction, rather than each line containing executed code.

During execution of a program (e.g., program 120), a given instruction is commonly executed more than once. Thus, in one embodiment, formatting may be applied to a step element (e.g., an instruction) in a manner indicative of multiple executions. That is, formatting may be applied to "track" or "record" the number of times a given instruction has been executed. Illustrative formatting includes a counter element which is incremented for each execution. The counter element may be a series of asterisks positioned adjacent the instruction, wherein the number of asterisks represents the number of executions. Persons skilled in the art will recognize other embodiments.

It is understood that the invention contemplates any number of methods and techniques for establishing the step region and the method illustrated in FIG. 4 is merely one embodiment. For example, in another embodiment a user may manually highlight a region in code space. In another embodiment, the step region may be designated according to statement type (e.g., all "for ( )" statements can be designated for inclusion in a step region).

In still another embodiment, the invention is used to advantage with compiler paragma. Compiler paragma are well known in the art and generally comprise code segments recognizable to a compiler. During compiling of a program, the code segments are expanded into several statements. In order to avoid requiring a user to single-step each of the expanded statements, a step region may be set to include the unexpanded compiler paragma. During execution of the program, the debugger 123 skips over the entire region which now includes the expanded code.

In yet another embodiment, the invention provides for a special mode whereby a user establishes a step region by single stepping through a series of statements. When the special mode is engaged, the debugger 123 operates to include each stepped statement within a step region. The user can then delimit the end of a step region via some action (e.g., a keystroke) recognizable to the debugger 123.

The latter embodiment (using the special mode) makes clear that a step region is not limited to contiguous statements in source code. This follows because statements may include branch conditions which, when executed, may result in continued execution in a noncontiguous manner with respect to the text of the source code. The resulting step region established using the special mode may, therefore, include multiple portions of source code separated from one another by code portions that were not stepped during the special mode activity.

The foregoing methods for establishing a step region are merely illustrative. Persons skilled in the art will recognize other techniques for establishing a step region.

Figure 7:
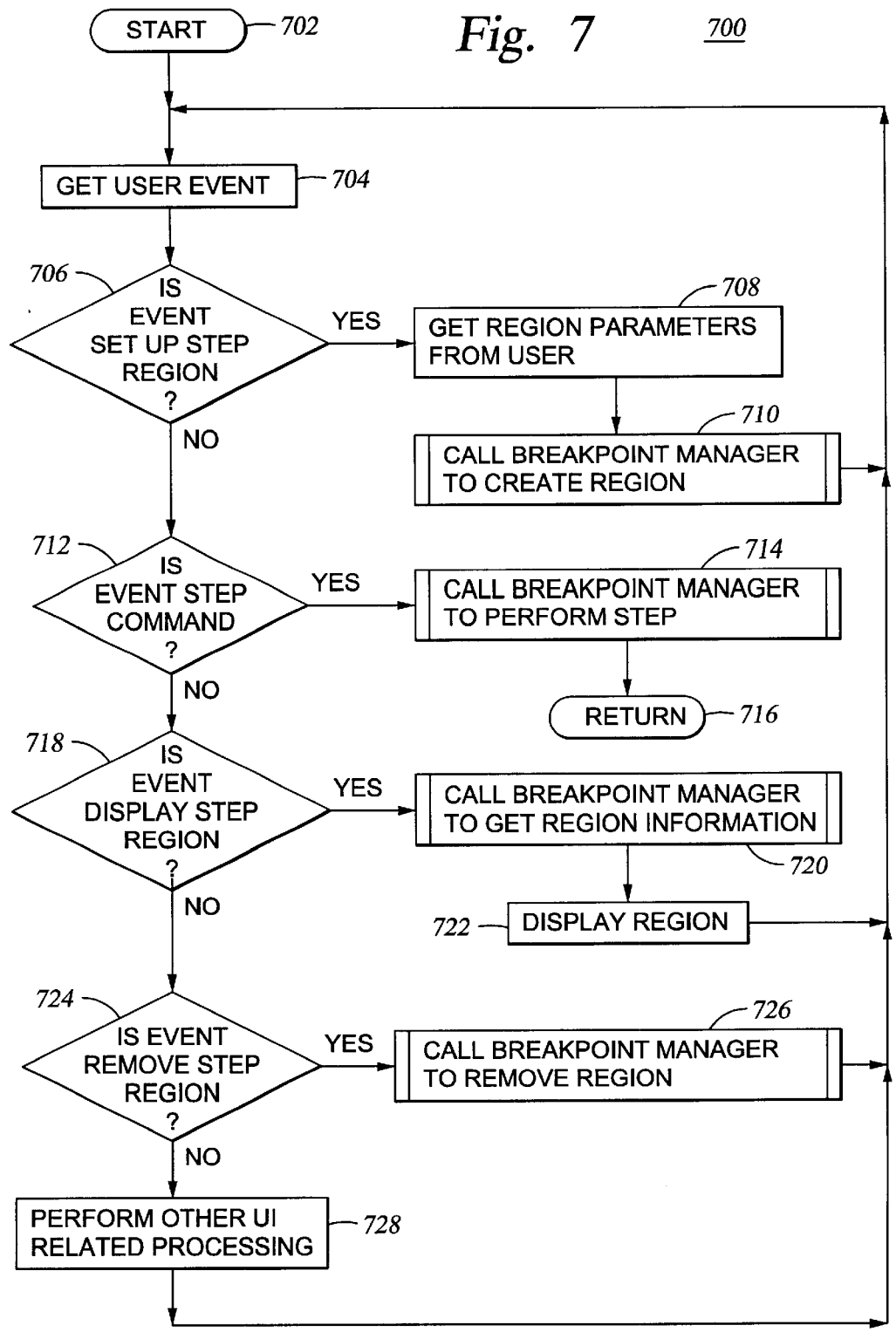
FIG. 7 is a flow diagram of a user interface for setting and handling control points.

Referring now to FIG. 7, a method 700 illustrating the operation of the user interface 124 is shown. The method 700 is entered at step 702 when the user interface 124 is called. At step 704, the user interface 124 gets an event corresponding to an instruction from the user.

At step 706, the method 700 queries whether the event is to establish a step region. If so, the user supplied parameters for setting the step region are retrieved (at step 708) and are passed to the user interface 124. The breakpoint manager 130 is then called (at step 710) to establish the step region. One embodiment illustrating the operation of the breakpoint manager 130 is described below with reference to FIG. 8. The method 700 then returns to step 704 to receive and process the next event.

If step 706 is answered negatively, the method 700 proceeds to step 712 and queries whether the event is a step command. The step command may include any conventional step operations as well as the inventive step functions described herein. If the event is a step command, the breakpoint manager 130 is called at step 714 to perform the step operation. The method 700 then returns at step 716.

If step 712 is answered negatively, the method 700 proceeds to step 718 and queries whether the event is to display a specified step region. Illustratively, the user may specify the region according to the region number contained in the field 304 of table 132. In another embodiment, the user may specify the region by placing a mouse pointer on the region in code space and clicking a mouse button. The particular method used to specify a step region is not limiting of the invention.

If step 718 is answered affirmatively, the breakpoint manager 130 is called at step 720 to retrieve the region information contained in field 310 of the table 132. At step 722, the step region is displayed on an output device (e.g., a computer monitor). The step region is formatted using the region information to identify the code included in the step region as well as the executed code of the region (as is illustrated in FIG. 6 described above). The method 700 then returns to step 704.

If step 718 is answered negatively, the method 700 queries whether the event is to remove a step region. Removing a step region may be accomplished by any number of methods including methods assisted by a series of keystrokes, a mouse pointer, voice command, identification of the step region according to its region number contained in field 304 of table 132 and the like. If the event is to remove a step region, the breakpoint manager 130 is called at step 726 to remove the region. The method 700 then returns to step 704.

If step 724 is answered negatively, the method 700 proceeds to step 728 to handle other processing known and unknown in the art. The method 700 then returns to step 704.

Figure 8A:
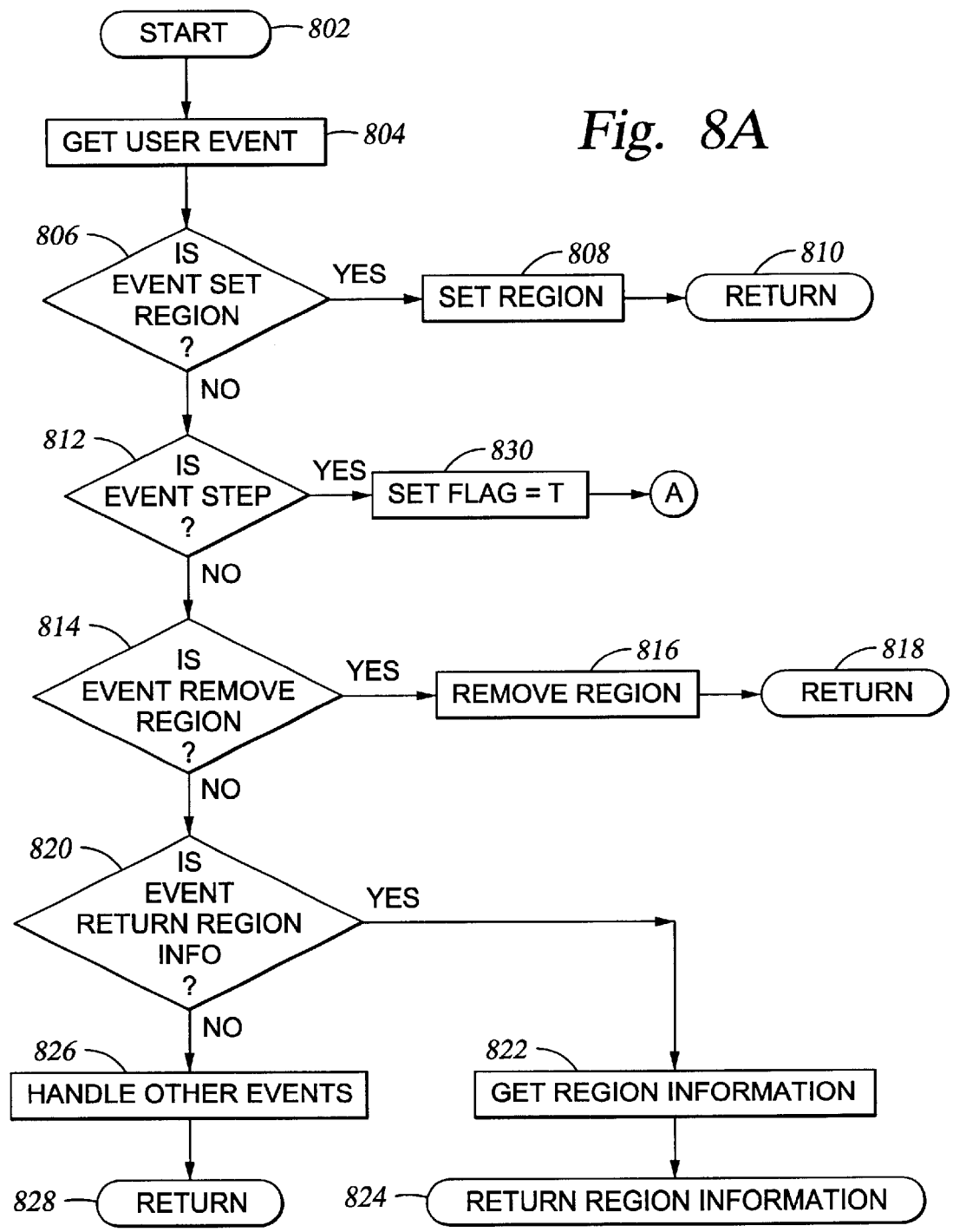
FIGS. 8A–8B are flow diagrams of a control point manager routine for setting and handling control points.
Figure 8B:
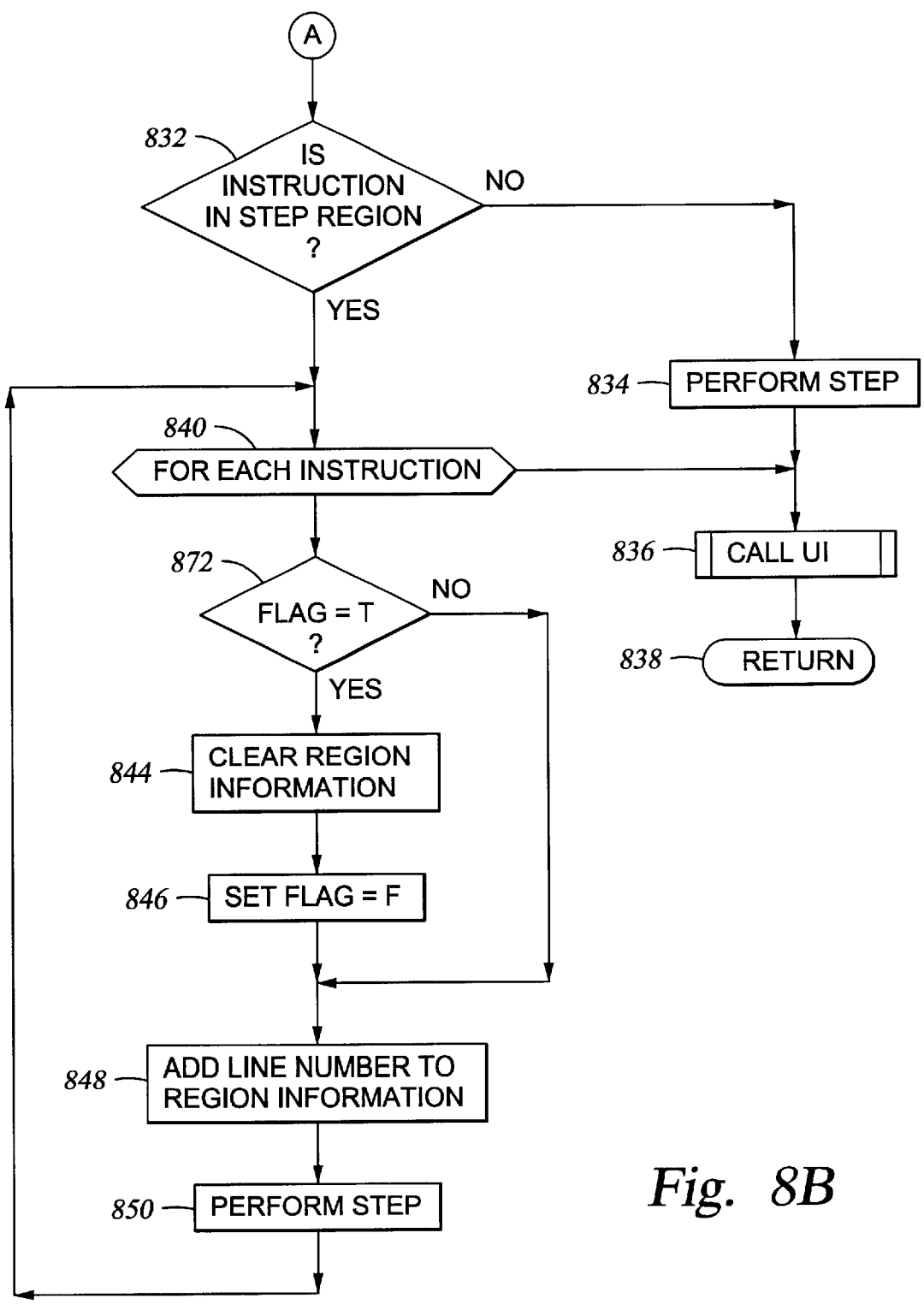

FIG. 8 shows one embodiment of a method 800 illustrating the operation of the breakpoint manager 130 in accordance with the invention. The method 800 provides for setting and handling control points, although the breakpoint manager may include other routines. The method 800 is entered at step 802 upon invocation of the breakpoint manager 130. The breakpoint manager 130 receives an event for processing at step 804.

At step 806, the method 800 queries whether the event is to set a step region. That is, a determination is made as to whether the breakpoint manager 130 is being called by the user interface 124 from step 710 described above. If so, the step region is set at step 808. Methods for setting a step region were described above. In one embodiment, setting the step region includes creating a record for the region in the control point table 132. The record comprises information stored to fields 302, 304, 306 and 308 of table 132. After setting the step region, the method 800 returns at step 810.

If step 806 is answered negatively, the method 800 proceeds to step 812 and queries whether the event is a step operation. That is, a determination is made as to whether the breakpoint manager 130 is called by the user interface 124 from step 714 described above. If not, the method 800 proceeds to step 814.

At step 814, the method 800 queries whether the event is to remove a step region. That is, a determination is made as to whether the breakpoint manager 130 is called by the user interface 124 from step 726 described above. If so, the step region is removed at step 816. The method 800 then returns at step 818.

If step 814 is answered negatively, the method 800 proceeds to step 820 and queries whether the event is to return region information (contained in table 132) for a specified step region. That is, a determination is made as to whether the breakpoint manager 130 is called by the user interface 124 from step 720 described above. If so, the region information is retrieved from the table 132 at step 822 and then passed to the user interface 124 at step 824.

If step 820 is answered negatively, the method 800 proceeds to step 826 where other events known and unknown in the art are handled. The method 800 then returns at step 828.

If, at step 812, the event being processed by the breakpoint manager 130 is a step operation, then the method 800 proceeds to step 830. At step 830, the value of a flag is set to "true." As will be described below, the flag value is used to initialize the entry in the field 310 of table 132. The method 800 then proceeds from step 830 to step 832.

At step 832 the method 800 queries whether the code element to be stepped is contained within a step region. This determination can be made by accessing the information contained in field 309 of the control point table 132. As described above with reference to FIG. 3, the step operations may be performed at an instruction level, a statement level, a line level, etc. For purposes of illustration, the information contained in field 309 is a listing of the instructions contained in the specified step region.

If step 832 is answered negatively, the method 800 performs a conventional step operation at step 832. The user interface 124 is then called at step 836 to display the results of the step operation to the user. The method 800 returns at step 838.

If, at step 832, the instruction to be stepped is contained within a step region, the method 800 proceeds to step 840. Method 800 then performs a series of operations (referred to herein as "the loop") for each instruction in the step region. Initially, the method 800 queries (at step 842) whether the flag value is set to "true." During a first pass through the loop, step 842 will be answered affirmatively and method 800 will proceed to step 844 where the region information for a specific step region is cleared from the table 132. The flag value will then be set to "false" at step 846. The method 800 then proceeds to step 848.

At step 848 the line number for the instruction being stepped is added to the region information field 310 of the control point table 132. As described above, in other embodiments the region information may comprise the individual instructions (or statements) being stepped. In any case, the method 800 then proceeds to step 850 to perform the step operation (e.g., step to the next instruction). The method 800 then returns to step 840 and repeats the steps of the loop for each instruction.

Upon reaching the first instruction beyond the exit point for the step region, the method 800 proceeds to step 836 where the user interface 124 is called. The method 800 then returns at step 838.

While the foregoing is directed to the preferred embodiment of the present invention, other and further embodiments of the invention may be devised without departing from the basic scope thereof, and the scope thereof is determined by the claims that follow.

What is claimed is:

1. A method for debugging a target program containing code, comprising:

in response to user input, establishing a region of the code by performing a step operation for a least a portion of the code wherein each segment of the portion of code included in the step operation is added to the region and wherein the region is any arbitrary user selected code comprising two or more statements;

executing the code;

halting execution of the code at a first executable instruction after an endpoint of the region;

generating debug information for an executed portion of the region; and displaying the region information on a display device.

2. The method of claim 1, wherein generating debug information for the executed portion of the region comprises formatting the executed portion with a visual indication.

3. A method for debugging a target program containing code, comprising:

in response to user input, establishing a region of the code by performing a step operation for a least a portion of the code wherein each segment of the portion of code included in the step operation is added to the region and wherein the region is any arbitrary user selected code comprising two or more statements;

while executing the code, stepping over the region of the code;

halting execution of the code at a first executable instruction after an endpoint of the region;

generating debug information for an executed portion of the code by formatting the executed portion with visual indicators; and displaying the region information on a display device.

4. A method for debugging a target program containing code, comprising:

in response to user input comprising a statement type selection, establishing a region of the code for each statement of the code being of the selected statement type, wherein establishing the region for each statement comprises programmatically traversing the code, identifying each of the statements of the code which match the statement type and designating an entry point in the code and an exit point in the code for each region, wherein the statement type selection is for any arbitrary user-selected statement type;

executing the code; and halting execution of the code at a first executable instruction after the exit point of a given region.

5. The method of claim 4, wherein executing the code comprises initiating execution with an entry point of the given region.

6. The method of claim 4, wherein executing the code comprises stepping over the regions.

7. The method of claim 4, wherein executing the code comprises:

determining whether a code segment is contained within the given region of the code; and if so, continuing execution of the code.

8. The method of claim 4, wherein the code is source code and the region of the code comprises consecutive statements.

9. The method of claim 4, further comprising:

generating region information to identify one or more executed portions of each region; and displaying the region information on a display device.

10. The method of claim 9, wherein generating region information comprises formatting the code with a visual indication to identify the one or more executed portions of each region.

11. A signal bearing medium containing code for a program which, when executed by one or more processors, performs a method for debugging the code, the method comprising:

in response to user input comprising a statement type selection, establishing a region of the code for each statement of the code being of the selected statement type, wherein establishing the region for each statement comprises programmatically traversing the code, identifying each of the statements of the code which match the statement type and designating an entry point in the code and an exit point in the code for each region, wherein the statement type selection is for any arbitrary user-selected statement type;

allowing execution of the code; and halting execution of the code at a first executable instruction after the exit point of a given region.

12. The signal bearing medium of claim 11, wherein executing the code comprises initiating execution with an entry point of the given region.

13. The signal bearing medium of claim 11, wherein executing the code comprises stepping over the regions.

14. The signal bearing medium of claim 11, wherein executing the code comprises:

determining whether a code segment is contained within the given region of the code; and if so, continuing execution of the code.

15. The signal bearing medium of claim 11, wherein the code is source code and the region of the code comprises consecutive statements.

16. The signal bearing medium of claim 11, wherein establishing the region of the code for each statement comprises performing a step operation wherein each segment of the code included in the step operation is added to the region of the code.

17. The signal bearing medium of claim 11, further comprising:

generating region information to identify one or more executed portions of each region; and displaying the region information on a display device.

18. The method of claim 17, wherein generating region information comprises formatting the code with a visual indication to identify the one or more executed portions of each region.

* * * * *